Apr. 10, 1923. Re. 15,576

J. W. HUBBARD

TICKET PRINTING MACHINE

Original Filed Nov. 27, 1918 5 sheets-sheet 1

INVENTOR
J. W. HUBBARD
BY Paul & Paul
ATTORNEYS

Apr. 10, 1923. Re. 15,576

J. W. HUBBARD

TICKET PRINTING MACHINE

Original Filed Nov. 27, 1918 5 sheets-sheet 2

INVENTOR
J. W. HUBBARD
BY Paul & Paul
ATTORNEYS

Apr. 10, 1923.
Re. 15,576
J. W. HUBBARD
TICKET PRINTING MACHINE
Original Filed Nov. 27, 1918 5 sheets-sheet 3
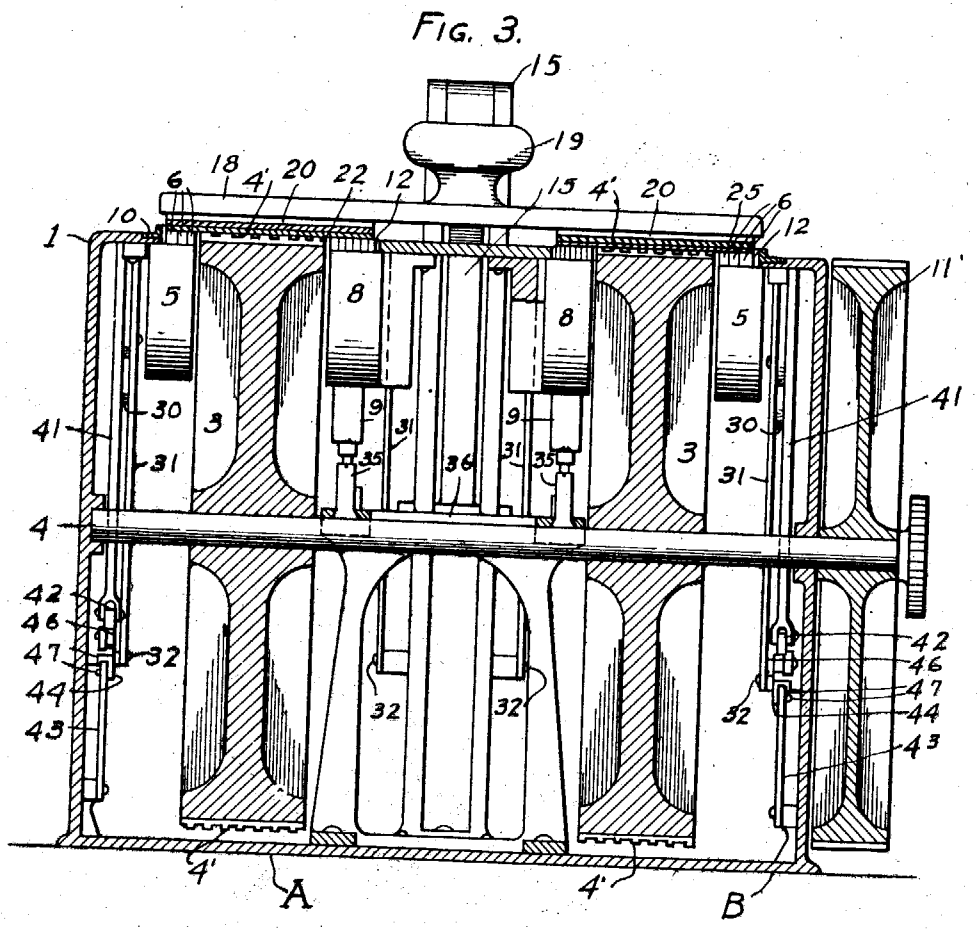
INVENTOR
J. W. HUBBARD
BY Pennie & Pennie
ATTORNEYS Apr. 10, 1923.

Re. 15,576

J. W. HUBBARD

TICKET PRINTING MACHINE

Original Filed Nov. 27, 1918 5 sheets-sheet 4

INVENTOR
J. W. HUBBARD
BY: Paul & Paul
ATTORNEYS

Apr. 10, 1923.

Re. 15,576

J. W. HUBBARD

TICKET PRINTING MACHINE

Original Filed Nov. 27, 1918 5 sheets-sheet 5

INVENTOR
J. W. HUBBARD

BY Paul & Paul

ATTORNEYS

Reissued Apr. 10, 1923. Re. 15,576

UNITED STATES PATENT OFFICE.

JAMES W. HUBBARD, OF EAU CLAIRE, WISCONSIN, ASSIGNOR, BY MESNE ASSIGNMENTS, TO CONTINENTAL AND COMMERCIAL TRUST AND SAVINGS BANK.

TICKET-PRINTING MACHINE.

Original No. 1,324,673, dated December 9, 1919, Serial No. 264,372, filed November 27, 1918. Application for reissue filed December 22, 1921. Serial No. 524,287.

*To all whom it may concern:*

Be it known that I, JAMES W. HUBBARD, a citizen of the United States, residing at Eau Claire, in the county of Eau Claire and State of Wisconsin, have invented new and useful Improvements in Ticket-Printing Machines, of which the following is a specification.

This invention relates to improvements in ticket printing machines and, in the present instance, has particular application to a machine for printing railway tickets, although, it will be understood, that the machine may be used in any place where tickets are sold such for instance as motion picture theaters, opera houses, auditoriums, restaurants, etc.

In carrying out the present invention it is my purpose to provide a ticket printing machine whereby, in a single operation, the usual or general information may be printed or impressed upon the ticket, the date of sale, destination, and rate also printed thereon, and which will provide a record, in the form of each and every ticket sold, thereby enabling the auditor or other inspector to check up the accounts properly.

As is well known, each ticket office of a railroad at the present time carries printed tickets to the various destinations or stopping points on the road, some of the smaller railway ticket offices carrying tickets only for a few destinations or stopping points, while the larger offices carry tickets for a great many stopping points. These tickets have to be carried in racks and are purchased by the railway companies in large quantities and an experienced seller who is familiar with the rate destination or stopping points and the arrangement of the tickets in the racks is usually employed in each station. The purchase of these printed tickets and the racks together with the employement of an experienced ticket seller entails a considerable expense. Therefore, it is also my purpose to provide a ticket printing machine whereby these and other objections will be eliminated and whereby complete tickets bearing the usual information, the date of sale, destination and the rate of each ticket may be printed in one operation.

Another object of my invention is the provision of a machine of the class described which will embrace the desired features of simplicity, efficiency, durability and ease of operation, and wherein the component parts will be so arranged and correlated as to reduce the possibility of derangement to a minimum.

With the above recited objects in view and others of a similar nature, the invention resides in the construction, combination and arrangement of parts set forth in and falling within the scope of the appended claims.

In the accompanying drawings:—

Figure 3 is a vertical sectional view on the lines 3—3 of Figure 1;

Figure 1:
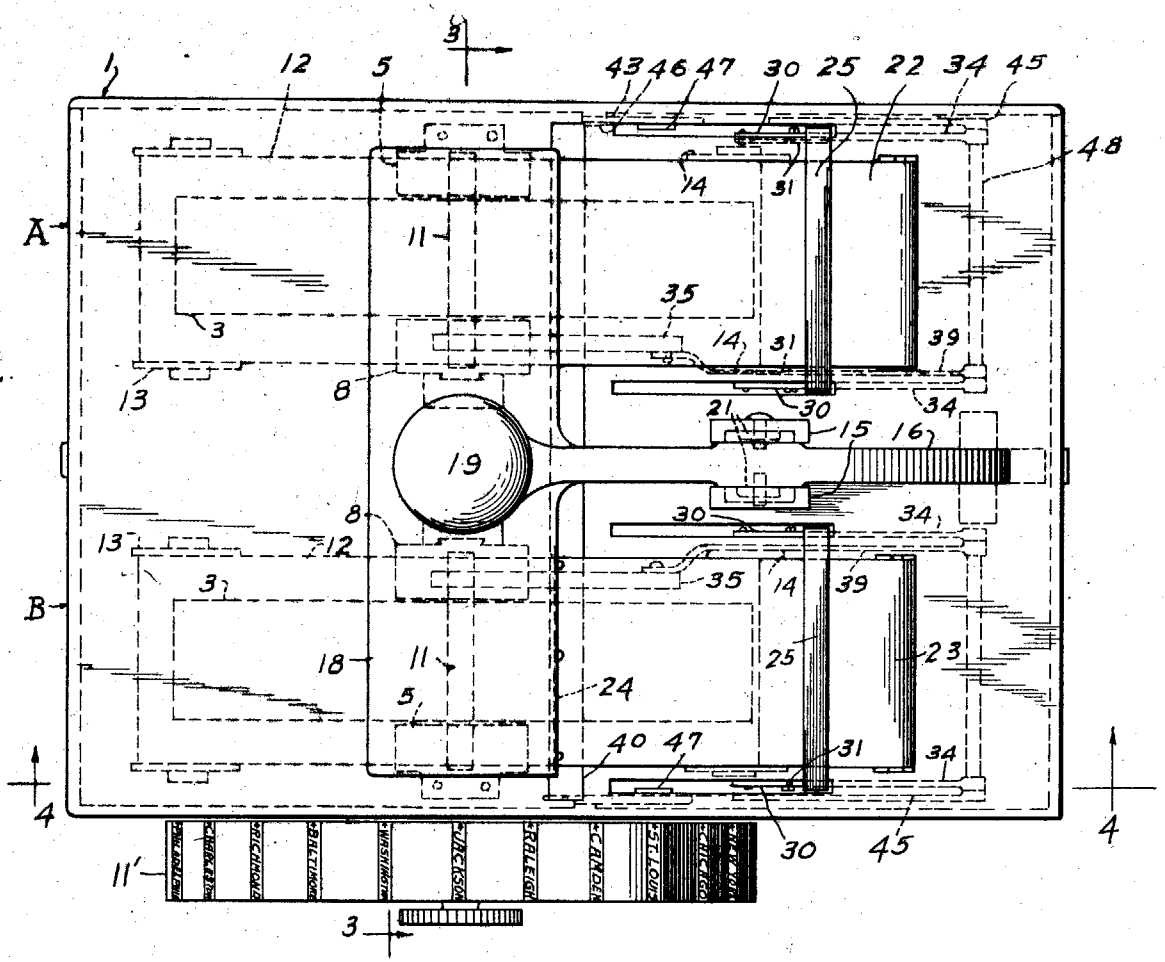
Figure 1 is a top plan view of a ticket printing machine constructed in accordance with my present invention.

In this selected embodiment of the invention there is shown a casing 1 which, in the present instance, is of substantially box-like form and embodies top, bottom, side and end walls. The top wall of the casing 1 adjacent each side wall thereof is formed with an opening 2 through which the type may be exposed at the printing point.

Arranged within the casing 1 at opposite sides thereof are duplicate printing apparatus. One set of printing apparatus is designed for the purpose of printing the tickets, while the other set of printing apparatus is adapted for the purpose of printing duplicates of the tickets sold upon a recording tape or strip which tape or strip is at all times held within the machine until removed therefrom by a properly authorized person for the purpose of checking up the number of tickets sold by the machine. Each printing apparatus is practically identical in construction to the other printing apparatus and each embodies a die carrier 3 which, in the present form of my invention, is in the form of disk or drum mountd upon a shaft 4 that extends across the casing 1 below the openings 2 and in line with such openings and has its ends journaled in suitable bearings carried by the confronting faces of the side walls of the casing 1. The die carriers 3 are arranged immediately below the respective printing openings 2 and the peripheries of the die carriers extend into the printing openings 2. Suitably fastened upon the periphery of each die carrier and extending across the same are printing dies 4′ spaced apart equal distances around the periphery of the carrier. The dies 4′ are termed destination and rates dies for the reason that the type on each die is adapted to print the name of a particular stopping point or destination and also the rate to such stopping point or destination.

Arranged upon one side of each die carrier 3 is a dating device 5, which, in the present instance, is in the form of a plurality of disks 6 arranged side by side and rotatably mounted upon a shaft 7 supported in suitable bearings depending from the top wall of the casing 1. The peripheries of the disks of each dating device are provided with type dies indicative of the names of the months in the year and with numeral bearing type dies respectively. The disks carrying the numeral bearing type dies are rotatable independently of one another so that the numeral dies indicative of the date of the month and the number of the year may be brought into printing position.

In the structure disclosed there are provided numbering machines 8, one of these numbering machines being arranged upon the side of each carrier 3. Each numbering machine 8 is of any approved or preferred construction and is automatic in its operation and equipped with a depending plunger 9 which is connected with the automatic mechanism of the numbering machine for changing the dial so that the numbers will be brought into printing position in proper sequence.

Figure 6:
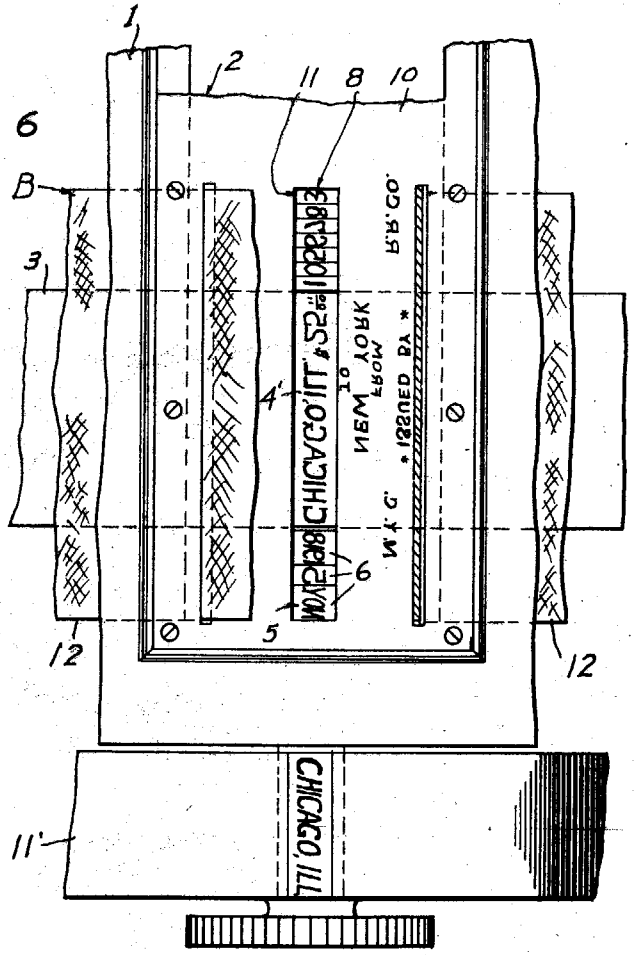
Figure 6 is an enlarged fragmentary plan view showing the arrangement of one set of printing dies.
Figure 2:
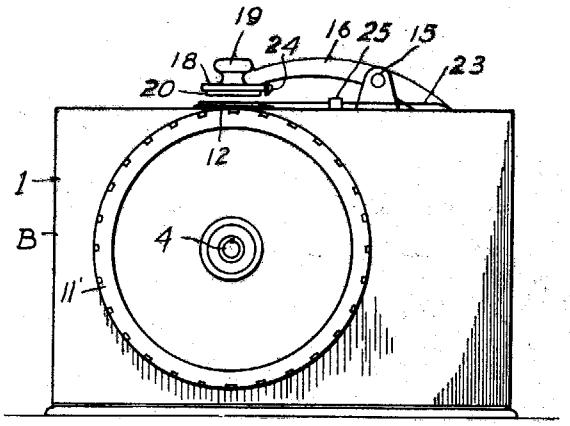
Figure 2 is a side elevation of the same.
Figure 9:
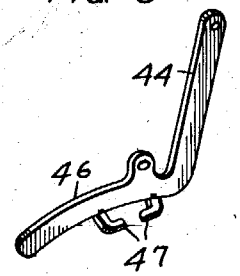
Figure 9 is an enlarged detail view of the cam for operating the presser-foot.
Figure 8:
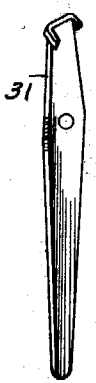
Figure 8 is an enlarged detail view of the strip-feeding lever.
Figure 7:
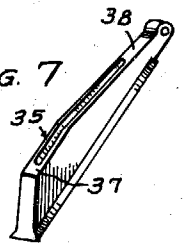
Figure 7 is an enlarged detail view of the slidable block for operating the numbering machine.

A stationary printing die 10, extending across each opening 2 in the top wall of the casing 1, conveys general information such, as for instance, as the name of the railroad issuing the ticket, the name of the station from which the ticket is bought, etc. This stationary printing die is formed with an elongated transverse slot 11 through which the particular destination and rate printing die on the carrier 3 is exposed, together with the numbering dies of the numbering machine and the dating die of the dating device, as clearly shown in Figure 6 of the drawing.

For the purpose of convenience I have designated the recording side of the machine by the letter A and the ticket printing side of the machine by the letter B. The end of the shaft 4 at the one side of the machine projects through the side wall of the casing 1 and fast upon this projecting end of the shaft is a drum 11′. Upon the periphery of the drum 11′ are the names of the stations or destinations borne by the type dies on the carriers 3 and these names are spaced apart around the periphery of the drum 11′ to correspond in position with the respective type dies on the carriers 3. This drum 11′ provides a means whereby the type carriers 3 may be revolved to bring the desired destination and rate dials into printing position thereby enabling the ticket seller to manipulate the carriers 3 from the exterior of the machine so that the proper destination and rates may be printed upon the tickets. It is conceivable, of course, that other operating means for the shaft carrying the type carriers 3 may be provided.

Suitable inking mechanism is provided for the various type dies. In the present instance this inking mechanism embodies inking ribbons 12 extending longitudinally of the machine across the upper surfaces of the respective stationary type dies 10. One end of each ribbon is secured to a drum 13 rotatably mounted upon a suitable support within the machine adjacent to the front wall thereof and the other end of each ribbon is secured to a drum 14 rotatably mounted within the casing 1 behind the corresponding stationary die.

Arranged in the center of the casing 1 adjacent to the rear wall thereof and projecting above the top wall is a bearing post 15. Pivoted between its ends upon the bearing post 15 is a lever 16 having the rear end curved downwardly behind the rear wall of the casing 1 as at 17 and the forward end projecting forwardly and downwardly and terminating at a point between the openings 2 in the top wall of the casing. Fastened to the forward end of the lever 16 is a crosshead or cross-piece 18 that projects laterally from the lever. The ends of the cross piece 18 overlie the respective stationary dies 10. In the present case the cross piece 18 is shown as formed integral with the forward end of the lever 16 and integral with the cross piece at the center thereof and projecting upwardly therefrom is a head 19. Secured to the lower side of the cross piece 18 adjacent to the ends thereof and overlying the stationary dies 10 respectively are platens 20. In this instance a spring 21 is interposed between the forward end of the lever 16 and the top wall of the casing 1 and this spring acts to hold the platen end of the lever normally in an upward position so that the platens will be spaced apart from the respective stationary dies 10.

The preferred printing material consists of paper in strip form. Rotatably mounted in the recorder side of the casing 1 and arranged in advance of and behind the stationary die 10 are rollers or drums 21′. In the present case the rear drum 21′ carries a roll of paper 22 and the outer end of this roll is carried across the printing die beneath the corresponding platen and secured to the forward drum 21′, the paper overlying the inking ribbon 12 so that when the platen is depressed under the action of the head 19, incident to the latter being struck, the imprint of the type dies will be transferred through the ribbon to the paper, thereby recording upon the paper the printed matter upon the stationary die 10, the destination and rate, and date of sale of the ticket and also the number of the ticket.

A roll of paper 23 is rotatably mounted in the rear of the casing 1 at the ticket side of the machine. The outer end of this roll of paper 23 is carried toward the forward end of the machine over the corresponding inking ribbon 12 between the type dies and the platen so that when the platen is struck down against the action of the spring 21 the ticket will be printed, incident to the impressions from the stationary die 10, the particular destination and rate die, the dating device and the numbering machine being transferred through the inking ribbon to the ticket.

From the construction just described it will be seen that each time a ticket is printed an exact duplicate of the ticket is made on the record strip of paper and as the record strip is confined within the casing 1 of the machine, tampering with such strip is prevented.

A knife 24 is suitably secured to the cross piece 18 behind the platen 20 at the ticket side of the machine so that in the downward movement of the platen to print the ticket the latter will be severed from the strip thereby enabling the ticket seller to withdraw the ticket from beneath the platen to hand the same to the purchaser.

The roll of paper at the recording side of the machine and the roll of paper at the ticket side of the machine are provided with suitable feeding devices whereby each strip may be advanced the length of one ticket exceeding the printing of the preceding ticket.

In the present instance each feeding device is arranged at the rear of the casing 1 within the latter and embodies horizontal jaws 25 and 26 arranged above and below the corresponding paper strip respectively and connected to the upper ends of vertical links 27 and 28. The lower ends of the links are pivotally connected as at 29 with a cam 30 at the opposite sides of the center of such cam. This cam is pivoted for rocking movement upon a lever 31 adjacent to the upper extremity of the latter. The lower end of the lever 31 is pivoted as at 32 upon a suitable support within the casing 1. The cam 30 immediately below the pivotal connection with the lever 31 is provided with a depending ear 33 and pivotally connected with the ear 33 is one end of an operating lever 34. When the lever 34 is pushed inwardly the cam 30 rocks about its pivotal connection with the lever 31 and in this rocking movement of the cam the link 27 moves upwardly while the link 28 is moved downwardly and in the downward movement of the link 28 the jaw 25 grips the upper surface of the paper while in the upward movement of the link 27 the jaw 26 grips the lower surface of the paper or strip.

This gripping action of the jaws on the paper or tape occurs in the initial movement of the operating lever 34 while in the continued movement of such lever the lever 31 swings about its fulcrum 32 with the effect to move the jaws forwardly the distance of one ticket so that a fresh section of the paper will be brought under the platen.

The plungers 9 of the respective numbering machines 8 respectively are provided with suitable operating devices and in the present instance each operating device comprises a block 35 slidably mounted upon a guide 36 suitably supported within the casing 1. The upper surface of the block 35 adjacent to its forward edge is straight as at 37 and inclined downwardly from the straight edge toward its rear end as at 38. The rear end of the block 35 is connected with one extremity of an operating rod 39 and the other end of the operating rod 39 projects toward the rear wall of the casing 1 and terminates alongside of the rearwardly projecting end of the lever 34.

Suitable paper or tape holding means is also provided in order to hold the strips of paper stationary during the printing operation. The paper holding means here shown for each tape comprises a presser foot 40 grooved to receive the knife 24 and secure to the upper end of a vertical rod 41 slidably mounted within the casing 1 and provided at its lower end with a roller 42. Fulcrumed upon a suitable support secured to the bottom wall of the casing 1 is the lower end of a lever 43. Pivotally connected with the upper extremity of the lever 43 is the lower end of a lever 44 which projects upwardly and rearwardly from the lever 43 and has its upper end pivotally connected with one end of a horizontal operating rod 45 the other end of which projects toward the rear wall of the casing and is in alinement with the outer ends of the lever 34 and rod 39. Integral with the lower end of the lever 44 and projecting forwardly therefrom is a segment 46 disposed beneath the roller 42 on the lower end of the rod 41. Integral with the lower edge of the segment 46 at the junction of the latter with the lever 44 are stops 47, disposed at the opposite edges respectively of the lever 43 and designed to limit the movement of the lever 44 independently of the lever 43.

Figure 4:
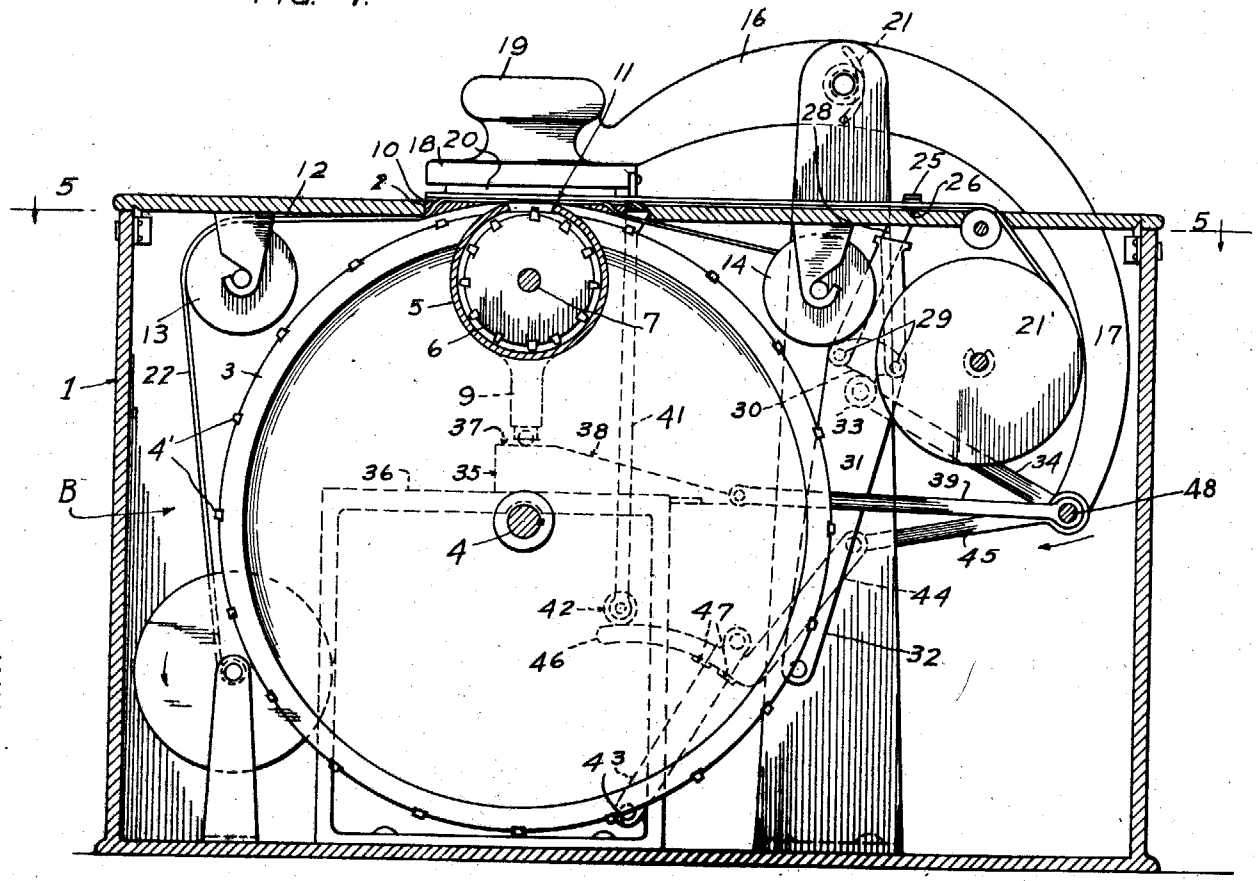
Figure 4 is a similar view on the lines 4—4 of Figure 1.
Figure 5:
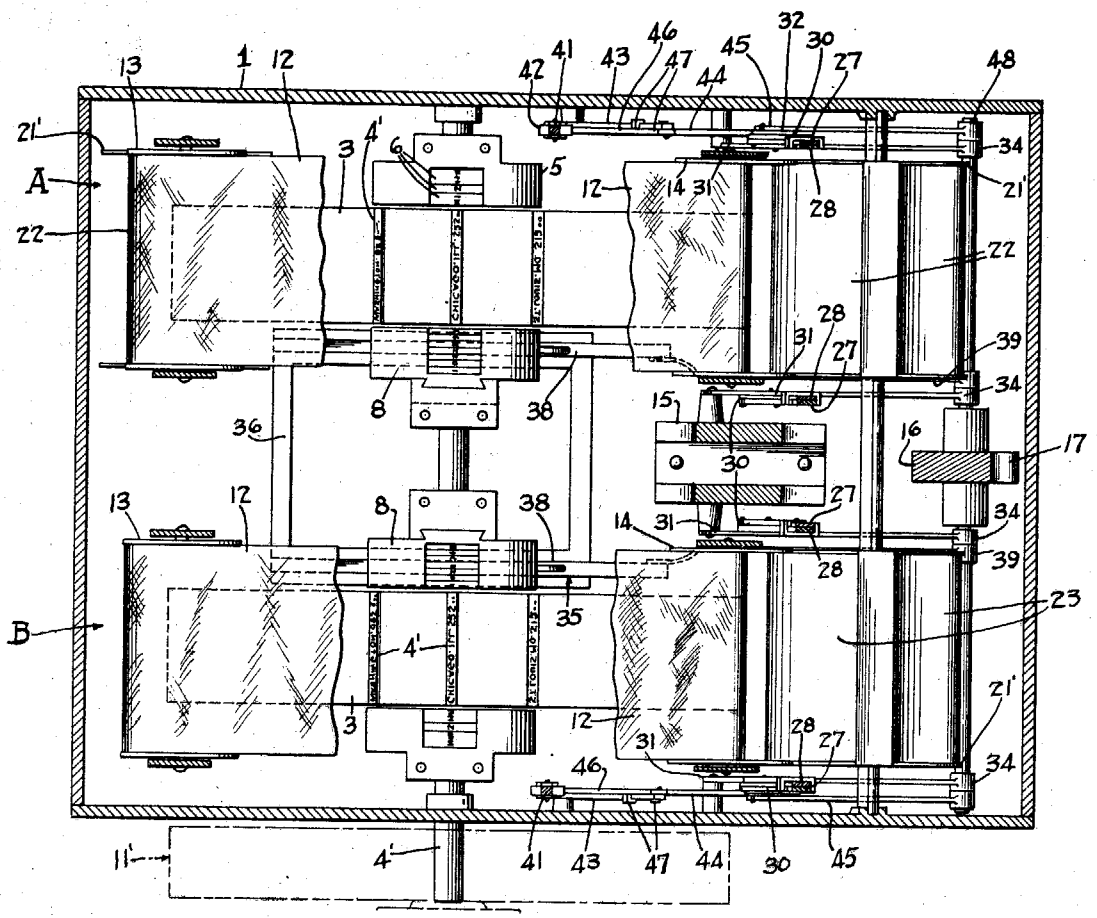
Figure 5 is a horizontal sectional view on the line 5—5 of Figure 4.

The lever 34, the rod 39 and the rod 45 at the recording and printing sides of the machine are operated by the lever 16 and in order to effect a connection between the lever 16 and said lever 34, rod 39 and rod 45, I have in the present instance, provided a horizontally disposed rod 48 that extends across the rear end of the casing 1 and through the lower end of the curved portion 17 of the lever 16. The ends of the rod 48 terminate adjacent to the respective side walls of the casing 1 and each end of the rod 48 is connected with the adjacent lever 34, rod 39, and rod 45, as clearly shown in Figure 4 of the drawing.

In the operation of my improved ticket printing machine, the lever 16 in its downward movement to print the ticket and make an impression upon the recording strip, exerts a pull upon the levers 34 thereby disengaging the jaws 25 and 26 from the respective strips of paper. Similarly, a pull is exerted upon the rods 39 and this pull upon the rods 39 actuates the blocks 35 to elevate the plunger 9 of the numbering machines, the inclined portion of each block moving the plunger upwardly to the straight portion of the block. A pull is also exerted upon the levers or rod 45 in the printing movement of the lever 16 and as each rod 45 is pulled the lever 44 connected therewith is swung about its pivotal connection with the upper end of the lever 43 with the effect to elevate the segments 46 and so engage the latter with the roller 42 in order to push the rod 41 upwardly to engage the presser-foot 40 with the underside of the particular tape thereby securely holding the tape in printing position during the printing operation.

When the platens are relieved of the printing pressure the spring 20 reacts and returns the lever 16 to normal position. In this movement of the lever 16 motion is transmitted to the jaws 25 and 26, as hereinbefore described, so that the respective paper strips will be advanced a distance equal to the length of one ticket thereby depositing new printing surfaces beneath the respective platens 20. In this movement of the levers 16 the rod 39 is pushed into the casing thereby sliding the block 35 over the guide 36 and in this movement of each block 35 the inclined edge 38 on the top surface of such block rides beneath the plunger 9 of each counting device or numbering machine so that the plunger of the numbering machine may move downwardly and change the number dial, thereby setting the number dial so that the next ticket will be properly numbered.

Simultaneously with this operation of the lever 34 and rod 39, a push is exerted upon the rods 45 to swing the levers 44 so that the lower ends of the rods 41 carrying the presser-foot 40 will be relieved of the influence of the segments 46 thereby enabling the paper strips to be released by the presser-feet so that such strips may be advanced under the action of the jaws 25 and 26.

From the foregoing description taken in connection with the accompanying drawings, the construction and mode of operation of my improved ticket printing machine will be readily apparent to those skilled in the art. It will be seen that I have provided a ticket printing machine whereby inexperienced ticket sellers may dispense tickets to the traveling public easily and conveniently whereby a complete record is kept and maintained of all tickets sold together with the destination of the respective tickets and the rate thereof.

While I have herein shown and described one particular form of the ticket printing machine for carrying out my invention, I wish it to be understood that I do not limit or confine myself to the particular construction herein described and delineated, as modifications and variations may be resorted to within the scope of the appended claims.

I claim as my invention:

1. In a ticket printing machine, duplicate printing dies, platens coacting with said dies respectively, a cross piece carrying said platens, an operating lever connected with said cross piece, means for feeding a ticket strip between one of said dies and platens, means for feeding a record strip between the other die and platen and means for actuating the feeding means by the lever.

2. In a ticket printing machine, a case having a pair of openings therein, a stationary die plate engaging each opening and having slots therein, duplicate printing dies in said case, means for bringing said dies into register with said slots, means for feeding a record strip from the case across one plate and back into the case, means for feeding a ticket strip from the case across the other die plate, a cross head, platens thereon for forcing the strips into engagement with the plates, a knife on said cross head for cutting the tickets from the ticket strip, an operating lever for the cross head, means actuated thereby for operating the strip feeding means, means for numbering and dating the record and ticket strips when the same are being printed on the die plates, means for actuating said last mentioned means by the operating lever and a presser-foot also actuated by the operating lever.

3. In a ticket printing machine, a plurality of printing dies, a platen means to coact with said dies, a member carrying the platen means, operating means connected with said platen-carrying member, means for feeding printing material between said dies and platen means including reciprocating grippers, and means for actuating the feeding means to reciprocate said grippers by said operating means.

4. In a ticket printing machine, a plurality of printing dies, a platen to coact with each die, a cross-head carrying all said platens, operating means connected with said cross-head, means for feeding separate strips of printing material in substantially the same horizontal plane between said dies and platen means, and means for actuating the feeding means by said operating means.

5. In a ticket printing machine, duplicate printing dies, platen means to coact with each die, a member carrying the platen means, operating means connected with said platen-carrying member, means for feeding a ticket strip between one of said dies and platen means including oscillatable grippers, means for feeding a record strip between the other die and platen means, and means for actuating the feeding means by said operating means.

6. In a ticket printing machine, a plurality of die plates having slots therein, printing dies, means for bringing said dies into register with said slots, means for feeding printing material across the die plates, a presser foot and rod for holding the material stationary while being printed upon, a platen means to coact with said plates and dies, a member carrying the platen means, operating means connected with said platen-carrying member, and means for actuating the feeding means and the said rod by said operating means.

7. In a ticket printing machine, a plurality of printing dies, one die including dating means and the other a numbering head, a platen means to coact with said dies, operating means for the platen means, means for feeding printing material between said dies and platen means and simultaneously operating the numbering head, and means to prevent movement of the printing material during the printing operation.

8. In a ticket printing machine, a plurality of printing dies, a platen means to coact with said dies, operating means for the platen means, means for feeding printing material between said dies and platen means, including a lever having grippers pivoted thereon, means to prevent movement of the printing material during the printing operation, and means for actuating said preventing means in timed relation to the feeding means.

9. In a ticket printing machine, a plurality of printing dies, a platen means to coact with said dies, operating means for the platen means, means for feeding duplicate strips of printing material one between each of said dies and platen means, means to prevent movement of both strips of the printing material during the printing operation, and means for reciprocating the feeding means and said preventing means by said operating means.

10. In a ticket printing machine, a plurality of printing dies, a platen means to coact with said dies, operating means for the platen means, means for feeding printing material between said dies and platen means, a presser-foot and reciprocating rod adapted to coact with said platen means to prevent movement of the printing material during the printing operation.

11. In a ticket printing machine, a printing die, a platen to coact with said die, operating means for the platen, means to feed a strip of printing material between the die and platen including reciprocating grippers, a knife carried by the platen, a member cooperable with said knife to sever the strip, and means to actuate said member in timed relation to the platen whereby the strip is cut during the printing operation.

12. In a ticket printing machine, a printing die, a platen to coact with said die, operating means for the platen, means to feed a strip of printing material between the die and platen, a knife carried by the platen, and means to prevent movement of the printing material during the printing operation, said preventing means being cooperable with said knife to sever the strip during the printing operation.

13. In a ticket printing machine, a printing die, a platen coacting with said die, a pivoted operating lever connected with said platen, means for feeding printing material between the die and platen, a presser-foot and reciprocating part adapted to prevent movement of the printing material during printing operation, a support therefor, means for actuating said support by movement of the platen lever whereby the presser-foot and platen are operated in timed relation.

14. In a ticket printing machine, a printing die, a platen coacting with said die, a pivoted operating lever connected with said platen, means for feeding printing material between the die and platen, a presser-foot adapted to prevent movement of the printing material during printing operation, a rod carrying said presser-foot, a cam member movable to control rod-movement, and means for moving the cam whereby the presser-foot and platen are operated in timed relation.

15. In a ticket printing machine, a printing die, a platen to coact with the die, operating means for the platen adapted to cause the die to print upon a strip of printing material fed between the die and platen, a pair of jaws operably disposed upon opposite sides of the strip, links connected to each jaw, means to actuate said links whereby the jaws grip and release the strip, means to provide a forward gripping movement to the jaws and a return released movement, means operably connected to the platen-operating means to actuate the jaws and links in timed relation to platen movement whereby the strip is fed before the platen is in printing position.

16. In a ticket printing machine, a printing die, a platen to coact with the die, operating means for the platen adapted to cause the die to print upon a strip of printing material fed between the die and platen, a pair of jaws operably disposed upon opposite sides of the strip and terminally projecting beyond each side of the strip, a pair of opposedly pivoted levers, a cam mounted to rock on each lever, a link connected to each jaw terminal and to an adjacent cam, the opposed links of each jaw being pivotally connected to opposite cams on similar sides of the cam axes, an operating lever pivotally connected to each cam and to the platen-operating means whereby the cam levers may be forwardly moved by the platen-operating means, the cams thereby rocked and the jaws caused to grip the strip and forwardly feed the same and upon return movement of the cam levers, the strip is released.

17. In a ticket printing machine, a printing die, a platen to coact with the die, operating means for the platen, means for feeding printing material between the die and platen including reciprocating grippers, means for actuating the platen and feeding means in timed relation, a numbering machine arranged to number said material, and operating member therefor, a cam movably mounted to actuate said operating member, and means for actuating the cam in timed relation to the platen.

18. In a ticket printing machine, a printing die, a platen to coact with the die, operating means for the platen, means for feeding printing material between the die and platen, means for actuating the platen and feeding means in timed relation, a numbering machine arranged to number said material, an operating rod for said numbering machine, a block slidably mounted adjacent the end of the rod and having a cam surface operably engaged by said rod end, means for sliding said block whereby the rod is actuated in timed relation to the platen.

19. In a ticket printing machine, a printing die including, a numbering machine, a lever pivotally mounted on said machine, a platen on said lever to coact with the die means for feeding printing material between said die and the platen, a cam for operating said numbering machine and means operably connecting said feeding and cam with the platen lever.

20. In a ticket printing machine, a printing die, including a numbering machine, a lever pivotally mounted on said machine, a platen on said lever to coact with the die, means for feeding printing material between said die and the platen, means to prevent movement of the printing material during printing operation including a presser foot and a reciprocating part, and means operably connecting said numbering machine, said feeding means and said movement-preventing means with the platen lever, and means for operating the platen lever.

21. In a ticket printing machine, a printing die, a numbering machine, a lever pivotally mounted on said machine, a platen on said lever to coact with the die and numbering machine, means for feeding printing material between said die and numbering machine and the platen, means to prevent movement of the printing material during printing operation, a rod carried by the platen lever, and means operably connecting said numbering machine, said feeding means, and said movement-preventing means with said rod, and means for operating the platen lever whereby the platen is moved to and from coacting position and the printing material is automatically held, printed, numbered and fed.

22. In a ticket printing machine, a printing die, a platen movably mounted to coact with the die, means for feeding a strip of printing material between the die and platen, a presser-foot operable to hold the printing material during the printing operation, a knife on the platen co-operable with said presser-foot to sever said strip during the printing operation, and means to operate the platen, the feeding means and presser-foot in timed relation.

In witness whereof, I have hereunto set my hand this 14th day of December, 1921.

JAMES W. HUBBARD.